United States Patent [19]

Seeburger, Harold O. et al.

[11] 4,296,227
[45] Oct. 20, 1981

[54] CURABLE POLYETHER RESINS

[75] Inventors: Harold O. Seeburger; George J. Atchison; Violete L. Stevens, all of Midland, Mich.

[73] Assignee: The Dow Chemical Company, Midland, Mich.

[21] Appl. No.: 117,154

[22] Filed: Jan. 31, 1980

[51] Int. Cl.³ .............................................. C08G 65/32
[52] U.S. Cl. .............................. 526/320; 204/159.22; 525/404; 525/529; 526/333; 568/611; 568/616
[58] Field of Search ................ 528/419; 525/404, 529; 526/320, 333; 568/611, 616; 204/159.22

[56] References Cited

U.S. PATENT DOCUMENTS

| | | | |
|---|---|---|---|
| 3,190,925 | 6/1965 | Stowe | 526/333 X |
| 3,532,642 | 10/1970 | Furukawa et al. | 528/393 X |
| 3,591,570 | 7/1971 | Gurgiolo et al. | 528/419 X |
| 3,728,321 | 4/1973 | Vandenberg | 528/393 X |
| 3,951,888 | 4/1976 | Isayama et al. | 528/393 X |
| 4,008,202 | 2/1977 | Evani et al. | 526/320 X |
| 4,105,649 | 8/1978 | Evani et al. | 526/320 X |

Primary Examiner—Earl A. Nielsen
Attorney, Agent, or Firm—Douglas N. Deline; Albin R. Lindstrom

[57] ABSTRACT

Polyether resins of the formula $XA_m$ wherein A is of the formula

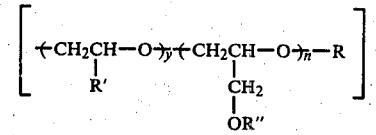

and X, R, R' and R" are specified substituents are disclosed.

9 Claims, No Drawings

CURABLE POLYETHER RESINS

BACKGROUND OF THE INVENTION

The invention relates to functionalized polyether resins. More particularly the invention relates to resins comprising a polyether backbone having covalently attached thereto at least one ether containing moiety further characterized by ethylenic unsaturation. More particularly, such ether moiety contains vinyl or allyl functionality.

Certain alkenyl benzyl polyglycol ether monomers described in U.S. Pat. No. 3,190,925 have the formula

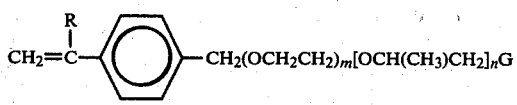

wherein R is hydrogen or methyl and G is hydrogen, alkyl, alkoxy, alkylthio or halogen.

Further polymeric compositions described in U.S. Pat. No. 4,008,202 are vinylbenzyl ether-containing monomers of the formula

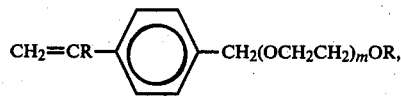

wherein R, is alkyl, alkaryl or aralkyl.

It has not been known to form polyglycol ether derivatives wherein the number of vinyl-containing pendant functional groups and their position in the molecule is completely variable. Neither has it been known to form vinyl-containing polyglycol ether derivatives having branched backbone structure. It has further not been known in the art to form such polyglycol ether derivatives wherein the vinyl-containing structural units appear in the molecule in either random, block, or both random and block form.

SUMMARY OF THE INVENTION

Accordingly, the novel polyether compounds of this invention of theoretical molecular weight less than 60,000 have the formula $XA_m$ wherein:

X is the residue left by the removal of m active hydrogen atoms from an initiator compound $XH_m$; and A is a moiety of the formula $$\{CH_2CH-O\}_y\{CH_2CH-O\}_n-R$$
$$\phantom{xxx}| \phantom{xxxxxxxxxxx} |$$
$$\phantom{xxx}R' \phantom{xxxxxxxxxx} CH_2$$
$$\phantom{xxxxxxxxxxxxxxxxx} |$$
$$\phantom{xxxxxxxxxxxxxxxxx} OR''$$

where:

R is independently each occurrence selected from

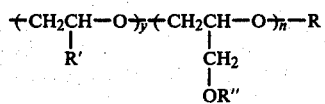

$-CH_2-CH=CH_2$ and hydrogen;

R' is independently each occurrence selected from hydrogen, halogen, $C_{1-4}$ alkyl or haloalkyl, and phenyl;

R'' is independently each occurrence a chain-terminating moiety selected from R, tertiary butyl, hydrogen, and a saturated or unsaturated ester functionality, or a chain-propagating moiety of the formula

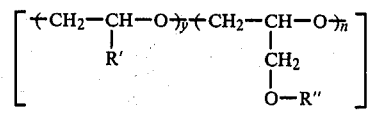

and y and n are numbers from zero to 500 provided that in at least one occurrence of A n is at least one and further provided that in at least one occurrence of A R or R'' is

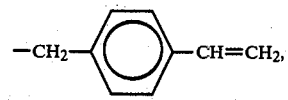

or $-CH_2-CH=CH_2$.

The polyether resins of the invention are capable of curing upon exposure to heat and by exposure to either actinic or electron beam radiation, making them useful in coatings and other curable resin applications. They may be used by themselves or in formulations containing other reactive monomers such as vinyl ester resins. Also included in the invention are such formulations containing the novel polyether compounds whether cured or uncured.

DETAILED DESCRIPTION OF THE INVENTION

The invented compounds may be described as derivatives of tertiary butyl glycidyl ether (t-BGE). They may be prepared by first reacting the t-BGE with an initiator compound, $X-H_m$, containing m reactive hydrogen atoms. Suitable such compounds include the alkanols, such as methanol, butanol, octanol, dodecanol and octadecanol; the alkenols, such as allyl alcohol, 10-undecen-1-ol, oleyl alcohol, and the like; alkylene glycols, such as ethylene, propylene, butylene, 1,4-tetramethylene and 1,3-hexylene glycols; the higher aliphatic polyols such as glycerol, pentaerythritol, sorbitol, sucrose, hexanetriol and the like; phenols, such as phenol, cresols, xylenols, hydroquinone, resorcinol, naphthols, and the like; and aralkanols, such as benzyl alcohol, phenethyl alcohol, and the like.

In one embodiment of the invention a block polymer of the desired formula may be produced by reacting excess t-BGE with a previously described initiator compound containing primary hydroxyl functionality. Essentially complete reaction of the primary hydroxyl functionality occurs followed by continued reaction of t-BGE with the secondary hydroxyl-containing reaction product. A block polymer is thereby formed of the formula

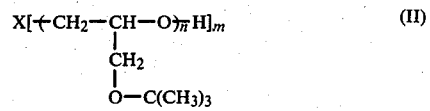

wherein X is the remnant of the initiator compound after removal of m active hydrogen atoms, and n is equal to or greater than one.

The invented compounds in their several embodiments may next be produced by different means. For example, compound (II) may be reacted before or after dealkylation of pendant tertiary butyl groups with sodium metal or an alkali metal hydroxide and then with vinyl benzyl halide or allyl halide according to a Williamson ether synthesis to produce some species of the invented compound. Further species of the invented compounds of formula I may be produced by combination of one or more additional steps selected from chain-progagating, chain-branching, dealkylating, and the above described functionalizing steps, all of which are described in more detail hereinafter.

Chain Propagation

Since all practical methods for making the compounds of the invention involve a condensation polymerization of the initiator compound with t-BGE, one or more other cyclic ethers can be copolymerized with t-BGE in this step. Suitable such ethers include ethylene, propylene, butylene and styrene oxides, 2-chloroethyloxirane, epichlorohydrin, tetrahydrofuran, oxetane, 2,2-bis(halomethyl)oxetane and the like. Such copolymers may be heretic (random), wherein the t-BGE and cyclic ether were reacted simultaneously, or they may be block copolymers, wherein the t-BGE and cyclic ether were reacted sequentially in any desired sequence and proportions and are of the following formula:

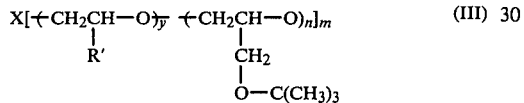  (III)

wherein X, R', m, n and y are as previously defined. The number of oxyalkylene units in the polymer chains (n+y in the above formula) may vary from two to about one thousand, depending on the monomers and catalyst used in its preparation.

Chain Branching

Chain branching is accomplished by first dealkylating the previously mentioned compounds containing pendant or terminal tertiary butyl ether functionality according to the hereinafter described technique followed by further reaction of the compound with one or more cyclic ethers including t-BGE as has been previously described. The result is to produce a polymer having branching units of the formula

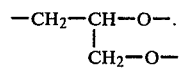

Such chain branching units are represented in the previously described polymer of formula (I) when R" is equal to the residue of the cyclic ether identical to the components otherwise constituting the polymer chain.

The dealkylation procedure previously referred to may be accomplished by any suitable process. One process involving contacting the tertiary butyl ether-containing polymer with a strong acid is described in U.S. Pat. No. 4,048,237 for which teaching this patent is incorporated herein by reference. The product formed by this dealkylation procedure contains primary hydroxyl functionality formed by removal of the pendant tertiary butyl functionality and substitution of a hydrogen radical therefor. It is understood that the chain branching and propagation steps herein described may be combined in any order and repeated any number of times to produce a large variety of compounds.

Polymer Functionalization

The polymer may be treated in a separate step in any desired sequence with the above-described chain branching and propagating steps to introduce the desired functionality into the polymer. The characterizing functionality of the instant compounds may be introduced as previously explained by means of a Williamson synthesis; reacting the sodium salt of the dealkylated product with vinyl benzyl halide or allyl halide to form the compounds of this invention. In a preferred embodiment the polymers of the invention containing vinyl or allyl functionality in non-chain terminating position are suitably produced by performing the Williamson synthesis as the succeeding step after dealkylation.

The Williamson synthesis is performed in a known manner. For example, the hydroxyl-containing polymer may be contacted with an alkali metal, i.e., sodium in an inert solvent to form the alkali metal salt. Alternatively the dealkylated polymer may be contacted at reflux with an alkali metal hydroxide. The alkali metal salt of the polymer is then contacted with vinylbenzyl halide or allyl halide in an inert solvent and at a temperature sufficient to allow the reaction to proceed. It has been found that a preferred solvent for production of the desired polymer in high yield is tertiary butyl alcohol, although other inert solvents commonly employed in Williamson syntheses may also be used.

While high yields and conversions may be obtained in employing this Williamson synthesis, it is to be expected, particularly for extremely complex polymers, that complete conversion of all hydroxyl functionality to vinyl or allyl moieties is not possible. Consequently, some polymer groups containing hydroxyl functionality may be expected to remain in some polymers of the invention.

Additional functionality may also be introduced into the polymer before or after the addition of vinyl moieties, taking care of course to employ procedures that do not destroy previously formed portions of the polymer. An example of suitable cofunctionality for use in combination with the vinyl-containing moieties previously described are the esters, introduced for example by esterification of a portion of the hydroxyl groups present with a saturated or unsaturated carboxylic acid, preferably after the Williamson synthesis previously described. Suitable ester producing carboxylic acid reactants and processes for producing polymers therewith are described in U.S. Pat. Nos. 4,014,854; 4,077,991 and 4,086,151 which teachings are incorporated herein by reference.

The invented functionalized polyether resins containing vinyl or allyl groups are curable by exposure to radiation, e.g., actinic or electron beam radiation, either with or without the presence of a suitable catalyst.

The compounds containing additional curable functionality in addition to vinyl benzyl ether or allyl ether, i.e., those compounds of the invention that additionally contain unsaturated ester functionality, may be cured such that both vinyl benzyl and vinyl ester cross-linking occurs in the cured composition. Such structures may suitably be cured in two steps. The ester, e.g., acrylate may be cured with radiation such that the vinyl benzyl ether or allyl ether functionality is substantially unaffected. Subsequently the remaining unsaturation may be cured, as for example, by higher energy radiation means or by known catalytic inducement such as by chemical free-radical means.

The invented functionalized polyether resins may furthermore be cured in the presence of suitable reactive monomeric or polymeric species referred to as reactive diluents. Accordingly, a mixture comprising the invented compound and an unsaturated compound capable of reaction with the ethylenic unsaturation of the vinyl or allyl functionality may be prepared and cured according to known means.

Suitable reactive monomers are those ethylenically unsaturated monomers known to polymerize under radiation inducement. Typical of such monomers are the alkyl acrylates and alkyl methacrylates.

The present polyether resins may also be blended with other unsaturated resin precursors such as the vinyl ester resins. Those vinyl ester resins are the reaction product of about equivalent amounts of a polyepoxide and an unsaturated monocarboxylic acid, for example, a diacrylate of the diglycidyl ether of bisphenol A. Those vinyl ester resins find extensive use in reinforced plastic applications and for that use usually require addition of a coreactive species to lower their viscosity and improve their rheology. The present polyethers are well adapted for use as such coreactive species and generally provide good cure speed, better shelf-life, lower toxicity and volatility than the commonly used acrylates.

The polyethers of this invention can also be blended to give beneficial results with other unsaturated resins and resin precursors such as the unsaturated polyesters.

Mixtures may also be produced containing the curable polyethers of the invention, optionally other unsaturated coreactive compounds previously described and inert components such as pigments, extenders, etc. Such mixtures may be used for example as coatings, inks and paints.

SPECIFIC EMBODIMENTS

Having described the invention the following examples are included for instructional purposes and are not to be construed as limiting the invention.

EXAMPLE 1

Vinylbenzyl ether derivative of polypropylene glycol

Initial formation of a derivative of polypropylene glycol and t-BGE was obtained by methods known in the art. One mole of polypropylene glycol of approximately 400 theoretical molecular weight and 99+ percent purity was reacted with 2 moles of t-BGE in the presence of NaOH catalyst. The dihydroxy derivative was recovered and then further reacted with propylene oxide to form a polypropylene glycol tertiary butyl ether of approximately 3,000 theoretical molecular weight. The product was then dealkylated by refluxing with paratoluene sulfonic acid. When substantially complete dealkylation of the pendant tertiary butyl groups was obtained, as determined by monitoring isobutylene evolution, the desired tetrol derivative was recovered by neutralizing the acid and filtering salt from the reaction product.

The dealkylated polymer was then functionalized by a Williamson synthesis carried out in the following manner. In a round-bottom flask equipped with agitator, reflux condenser, thermometer, dropping funnel and nitrogen purge, the tetrol derivative produced above was combined with t-butyl alcohol solvent. An equal number of equivalents of sodium metal were added with stirring under a nitrogen atmosphere. The contents of the flask were heated to reflux (about 85° C.) and maintained at that temperature for about 6 hours until reaction of the sodium metal was substantially complete.

To this mixture a small sample of hydroquinone was added as a vinyl polymerization inhibitor. The mixture was stirred at a temperature of about 70° C. while sufficient vinylbenzyl chloride to react with all sodium alkoxide moieties was added. After a small exothermic reaction the mixture was maintained at about 70° C.–75° C. for about 6 hours.

Analysis by base titration and inorganic chloride determined the degree of conversion to the vinylbenzyl ether derivative to be 93 to 97 percent. The reaction was continued for an additional hour, the mixture was neutralized with aqueous HCl and the light reaction products and impurities, e.g., tertiary butyl alcohol and water, removed by vacuum distillation. The product, recovered by filtration to remove salt residue was a clear to light brown liquid.

EXAMPLES 2–3

The same procedure employed to produce the compounds of Example 1 were used to produce vinylbenzyl ether derivatives of t-BGE adducts of the following initiators and cyclic ethers.

TABLE I

| Example | Initiator | t-BGE (moles) | Cyclic ether | Comments |
|---|---|---|---|---|
| 2 | Bisphenol A | 3 | EO (20 moles) | heteric |
| 3 | EG | 4 | PO (25 moles) | block* |

EO = Ethylene oxide
EG = Ethylene glycol
PO = Propylene oxide
*Produced by first reacting EG with PO (25 moles) then with t-BGE (4 moles) followed by dealkylation and the Williamson synthesis.

Representative examples of coating compositions formed from the vinyl-containing compounds of Examples 2 and 3 were produced and compared with standard compositions utilizing vinyl ester resins as reactive diluents. Results of the formulation procedures are contained in Table II. Results of testing procedures comparing coating compositions cured with ultraviolet light are contained in Table III. Results of curing with electron beam radiation are contained in Table IV.

TABLE II

| Composition | 1 | 2 |
|---|---|---|
| Reactive Diluent | | |
| 40% vinylbenzyl ether | Ex. 2 | Ex. 3 |
| 60% vinyl ester resin | DDE | DDE |
| Photo initiator (3%) | BPA | BPA |

DDE = A diacrylate of a diglycidyl ether of bisphenol A having an epoxy equivalent weight of about 180 g.
BPA = 2-Butoxy-2-phenyl acetophenone photo initiator.

Compositions 1 and 2 were prepared by combining the compounds listed and warming to obtain easy mixing. After a uniform consistency was obtained the samples were coated onto 20 gauge steel test panels with a No. 16 Maier rod producing a film about 0.02 mm thick. The coated panels were passed under a medium pressure and high pressure mercury arc bulk cure unit for curing by ultraviolet radiation.

Compositions cured by electron beam radiation were prepared in the same manner as above except that no photo initiator was added. The compositions were coated onto test panels according to the same method previously employed. Curing was produced by an electron beam producing 0.25 megarad for each pass through the electron beam. Curing according to these techniques caused cross-linking between adjacent molecules to occur due to reaction between the ethylenic unsaturation present in the compounds.

Standard tests were used to evaluate the coatings produced.

TABLE III

| | | U.V. Cure | | Solvent Resistance | |
|---|---|---|---|---|---|
| Composition | Passes to Cure | Pencil Hardness of film | Reverse impact inch/lbs | water | Methyl ethyl ketone |
| 1 | 1 | HB | 5 | good | good |
| 2 | 2 | 4H | <5 | good | good |

TABLE IV

| | | Electron Beam Cure | | Solvent Resistance | |
|---|---|---|---|---|---|
| Composition | Passes to Cure | Pencil Hardness of film | Reverse impact inch/lbs | water | Methyl ethyl ketone |
| 1 | 4 | H | 60 | good | fair |
| 2 | 4 | 3H | 35 | good | fair |

What is claimed is:

1. A curable polyether compound of theoretical molecular weight less than 60,000 of the formula $XA_m$ wherein:

X is the residue left by the removal of m active hydrogen atoms from an initiator compound $XH_m$; and a is a moiety of the formula $$\left(CH_2CH-O\right)_y\left(CH_2CH-O\right)_n-R$$
$$\quad\quad\ \ |\quad\quad\quad\quad\ \ |$$
$$\quad\quad\ \ R'\quad\quad\quad\quad CH_2$$
$$\quad\quad\quad\quad\quad\quad\quad\quad\ |$$
$$\quad\quad\quad\quad\quad\quad\quad\quad OR''$$

where:
R is independently each occurrence selected from

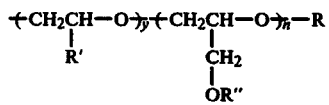

$-CH_2-CH=CH_2$ and hydrogen;

R' is independently each occurrence selected from hydrogen, halogen $C_{1-4}$ alkyl or haloalkyl and phenyl;

R" is independently each occurrence a chain-terminating moiety selected from R, tertiary butyl, hydrogen, and a saturated or unsaturated ester functionality, or a chain-propagating moiety of the formula

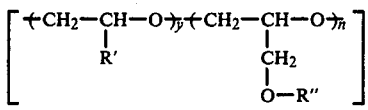

and y and n are numbers from zero to 500 provided that in at least one occurrence of A n is at least one, and further provided that in at least one occurrence of A, R or R" is

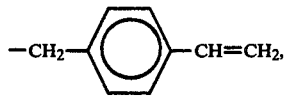

or $-CH_2-CH=CH_2$.

2. The curable polyether compound of claim 1 wherein R" is, in at least one occurrence of A,

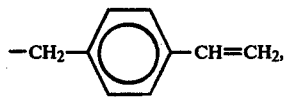

or $-CH_2-CH=CH_2$.

3. The curable polyether compound of claim 1 wherein R" is, in at least one occurrence of A,

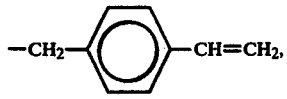

4. The curable polyether compound of claim 1 wherein at least one occurrence of A R" is a saturated or unsaturated ester functionality.

5. The curable polyether compound of claim 1 wherein X is residue left by removal of m active hydrogen atoms from an initiator compound, $XH_m$, selected from alkanols, alkenols, alkylene glycols, aliphatic polyols and phenols.

6. A cured polyether formed by exposure of a compound of claim 1 to actinic or electron beam radiation for a sufficient time to cause substantially complete reaction of the ethylenic unsaturation contained therein.

7. A curable mixture comprising Component (a) a compound of claim 1, and Component (b) an unsaturated reactive compound capable of curing with the compound of claim 1.

8. The curable mixture of claim 7 wherein Component (b) is a vinyl ester resin.

9. The curable mixture of claim 8 wherein said vinyl ester resin is the diacrylate of the diglycidyl ether of bisphenol A.

* * * * *